United States Patent [19]

Warren

[11] Patent Number: 5,095,655

[45] Date of Patent: Mar. 17, 1992

[54] VEHICLE SIDE DOOR ASSEMBLY HAVING FOUR SIDED FLUSH GLASS WINDOW

[75] Inventor: James R. Warren, Lincoln Park, Mich.

[73] Assignee: General Motors Corporation, Detroit, Mich.

[21] Appl. No.: 689,581

[22] Filed: Apr. 23, 1991

[51] Int. Cl.$^5$ ............................................. E05F 11/38
[52] U.S. Cl. ........................................ 49/374; 49/377; 49/441; 49/502
[58] Field of Search ............... 49/374, 375, 376, 377, 49/348, 349, 350, 351, 352, 353, 440, 441, 502

[56] References Cited

U.S. PATENT DOCUMENTS

| | | | |
|---|---|---|---|
| 2,024,773 | 12/1935 | Lohrman | 296/48 |
| 2,979,327 | 4/1961 | Swanson et al. | 268/124 |
| 4,454,688 | 6/1984 | Rest et al. | 49/374 X |
| 4,561,211 | 12/1985 | Raley et al. | 49/374 |
| 4,575,967 | 3/1986 | Bickerstaff | 49/211 |
| 4,608,779 | 9/1986 | Maeda et al. | 49/374 |
| 5,038,521 | 8/1991 | Andrzejewski et al. | 49/441 |
| 5,042,200 | 8/1991 | Ugawa | 49/374 X |

FOREIGN PATENT DOCUMENTS 2435766 2/1976 Fed. Rep. of Germany .
2843004 4/1980 Fed. Rep. of Germany .

Primary Examiner—Philip C. Kannan
Attorney, Agent, or Firm—William A. Schuetz

[57] ABSTRACT

A vehicle door assembly has a pair of spaced guide channels carried below its belt line which slidably receives pin guides secured to the sides of the lower end portion of the window for guiding the movement of a window between its open and closed positions. The window is bent along a horizontal line so that its exterior surface will be substantially flush with an exterior surface of the door assembly when in its closed position. The door assembly also includes a door frame means which permits lateral movement of the window as it is moved between its open and closed positions and a seal means carried by the door frame which engages the window along its interior sides to bias the same outwardly toward an outer flange on the door frame. The seal means includes a vertically extending dowel portion, preferably a tapered dowel portion, which engages an upper side edge of the window as it approaches its closed position to retain the window outwardly against the outer flange of the door frame means in order to stabilize the window against inward lateral movement when in its closed position. The two side pin guides received in the channels and the dowel provide a triangulated or three point stabilizing means for the window when the latter is in its closed position.

4 Claims, 3 Drawing Sheets

VEHICLE SIDE DOOR ASSEMBLY HAVING FOUR SIDED FLUSH GLASS WINDOW

The present invention relates to a framed vehicle door assembly and, more particularly, to a framed vehicle door assembly having a movable bent window which is substantially flush with the frame and door on all four exterior sides of the window when it reaches its closed position.

Heretofore, door assemblies have been provided in which a movable door window carried by the door assembly is substantially flush with the door or outer body structure of the vehicle along all four sides when in its closed position. Examples of such flush glass systems for a vehicle door are shown in U.S. Pat. No. 4,575,967 and U.S. Pat. No. 4,561,211, assigned to the same assignee as the present invention. U.S. Pat. No. 4,575,967 shows using a bent window and a guide track arrangement which includes outwardly directed fixed sections for causing the window as it approaches its closed position to be moved outwardly so as to be substantially flush with the exterior panel of the vehicle door and to be substantially flush along its top and sides with the door frame. This arrangement includes a pair of lower pin guides or rollers adjacent the lower end of the window and a third pin guide or roller adjacent a top side edge of the window for stabilization purposes. U.S. Pat. No. 4,561,211 shows a track and window having tapered side guides which cause the window to be moved outwardly so as to be substantially flush with the exterior panel of the vehicle door and to be substantially flush with the vehicle door frame. In this arrangement, the side guides extend laterally along the window in order to stabilize the window against inward lateral movement when in its closed position.

In accordance with the provisions of the present invention, a novel vehicle door assembly is provided which achieves substantial flushness of the movable window, when in its closed position, with the adjacent door frame means and exterior panel of the door at its belt line and in which this substantial flushness is achieved without requiring any pin guides attached to the window above the belt line and without requiring a guide track arrangement for affecting lateral outward movement of the window as it approaches its closed position.

This is achieved, in accordance with the provisions of the present invention, by providing a pair of spaced guide channels carried by the door assembly below its belt line which slidably receives pin guides secured to the sides of the lower end portion of the window and which guides the movement of the window between its open and closed positions. The window is bent along a horizontal line so that its exterior surface will be substantially flush with an exterior surface of the door assembly when in its closed position. The door assembly also includes a door frame means which permits lateral movement of the window as it is moved between its open and closed positions and a seal means carried by the door frame which engages the window along its interior sides to bias the same outwardly toward an outer flange on the door frame. The seal means includes a vertically extending dowel portion, preferably a tapered dowel portion, which engages an upper side edge of the window as it approaches its closed position. The seal means biases the window outwardly toward the outer flange of the door frame means to provide a seal and the dowel portion positions and retains the window outwardly against the outer flange of the door frame means in order to stabilize the window against inward lateral movement when in its closed position. The two side pin guides received in the channels and the dowel portion thus provide a triangulated or three point stabilizing means for the window when the latter is in its closed position.

The present invention further resides in various novel constructions and arrangement of parts, and further features, novel characteristics and advantages of the present invention will be apparent to those skilled in the art to which it relates and from the following detailed description of the illustrated, preferred embodiment thereof made with reference to the accompanying drawings forming a part of this specification and in which similar reference numerals are employed to designate corresponding parts throughout the several views, and in which.

Figure 1:
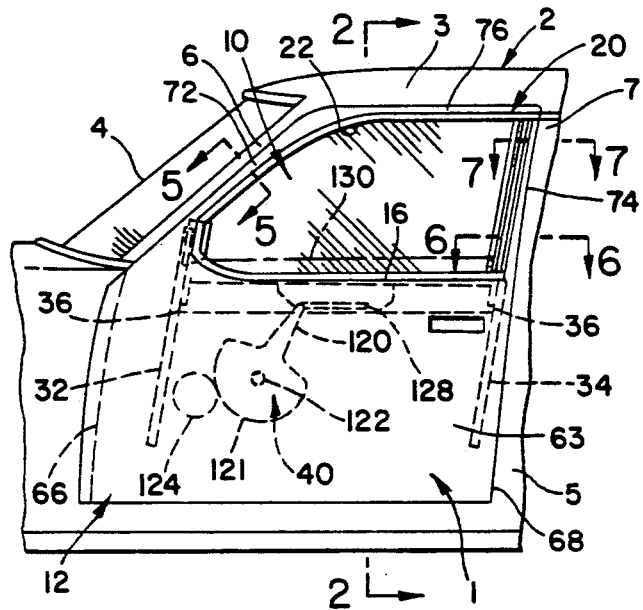
FIG. 1 is a fragmentary side elevational view of an automotive vehicle incorporating the novel door assembly of the present invention.

The present invention provides a novel framed vehicle door assembly 1 for an automotive vehicle 2. The automotive vehicle 2 has a roof structure 3, a front windshield 4 and side vehicle body structure 5 which defines an opening for receiving the door 1. The vehicle 2 also has a front or "A" pillar 6 and a rear or "B" pillar 7. The vehicle door assembly 1 includes a movable curved window 10 which is substantially flush with the door assembly on all four exterior sides of the window 10 when in its closed position, as shown in FIG. 1.

Figure 2:
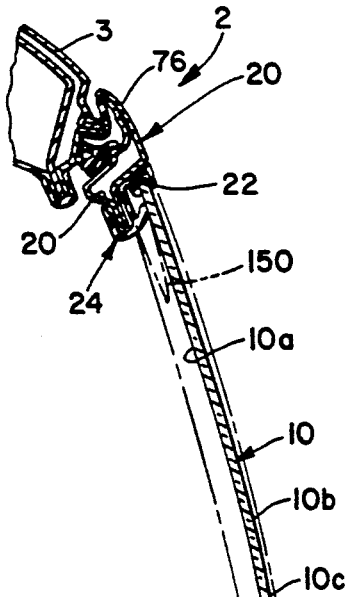
FIG. 2 is an enlarged fragmentary sectional view taken approximately along lines 2—2 of FIG. 1.

Referring to FIGS. 1 and 2 of the drawings, the novel door assembly 1 comprises, in general, a lower door body structure 12 having a top opening 14 extending longitudinally of the door assembly 1 at its belt line 16, an upper door frame means or door frame 20 which defines with the lower door body structure 12 a window opening 22, a first seal means 24 carried by the frame 20 which is sealingly engageable with the window 10 along its side and top edge portions on its interior surface 10a and which biases the window outwardly toward engagement with an exterior flange on the door frame 20, a pair of spaced guide channels 32, 34 supported by the lower door body structure 12, a pair of guides 36 secured to the window 10 at its opposite sides adjacent its lower end and which is slidably received in the guide channels 32, 34, a window regulator means 40 carried by the lower body structure for effecting movement of the window 10 between its open and closed positions, and a second seal means 42 carried by the lower body structure 12 adjacent the belt lines 16 for engagement with the window 10 when in its closed position.

The lower door body structure 12 of the door assembly 1 comprises an outer panel 63, a spaced inner panel 64 and spaced end walls 66, 68 which together define an interior compartment 70. The interior compartment 70 has a top opening 14 at the belt line or top end 16 of the lower door body structure 12 through which the window 10 can pass.

Figure 5:
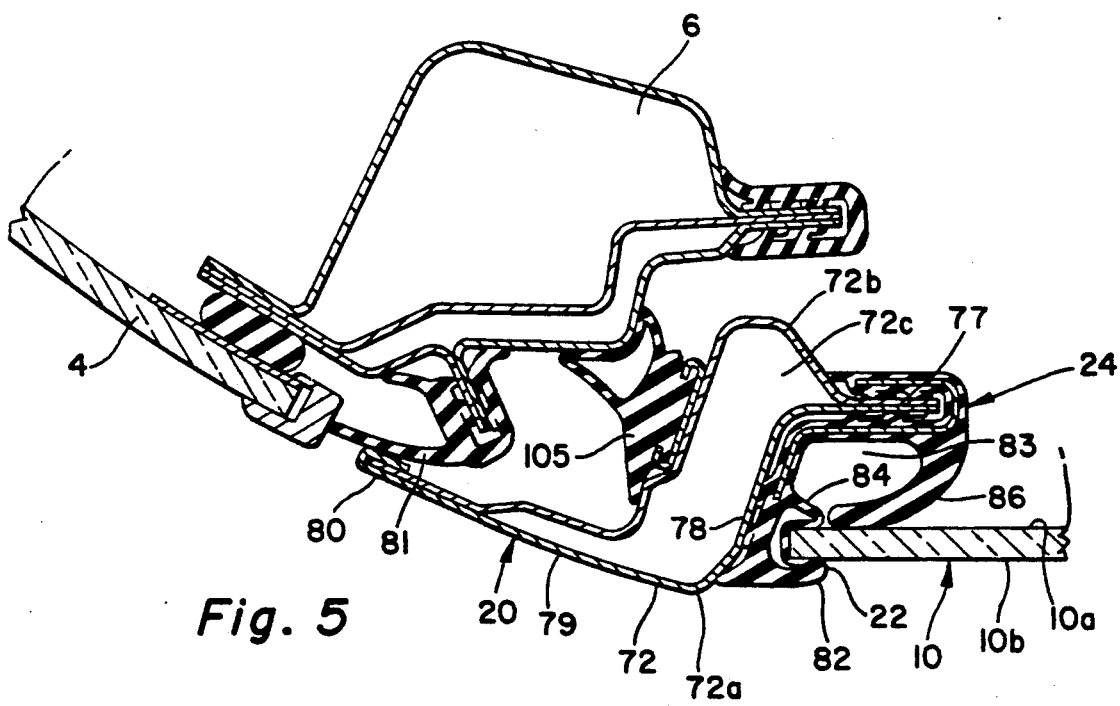
FIG. 5 is an enlarged fragmentary sectional view taken approximately along line 5—5 of FIG. 1.

The upper door frame 20 is of a generally inverted U-shaped configuration, as viewed in side elevation in FIG. 1 and comprises fore and aft sides 72, 74, respectively, and a top 76. As best shown in FIG. 5 (which is a sectional view through the fore side 72 of the door frame means 20), the fore or front side 72 comprises inner and outer metal stampings 72a and 72b which are overlapped and joined together at their adjacent side edges to form a hollow center 72c. As shown in FIG. 5, the rearward joined together side edges of the inner and outer panel 72a, 72b define an inner flange 77 for the door frame side 72. The inner flange 77 is spaced laterally inward from the window 10. The outer stamping 72a is also stamped or bent to a configuration so as to define a bottom 78 spaced laterally from the side edge of the window 10. The outer panel 72a also has an exterior forwardly extending portion 79 which extends toward the windshield 4. The front side edge portion 80 of the front side 72 of the door frame means 20 is adapted to engage a flexible seal 81 carried by the vehicle front pillar 6 when the door is in its closed position, as shown in FIG. 5, and be substantially flush with the windshield 4.

The front side 72 of the door frame 20 carries the seal means 24. The seal means 24 is secured to the front side 72 and comprises a metal reinforced elastomeric seal which surrounds the inner flange 77, extends along the inner side of the flange 77 and extends along the bottom 78 of the outer panel 72a. The seal means 24 terminates at its outer end in a vertically disposed outer flange 82 which overlies the front side edge of the window 10. The flanges 77 and 82 and the bottom 78 define a glass run channel 83. The flange 82 is substantially flush with the exterior surface 79 of the front side of the door frame 72 and is adapted to be engaged by the exterior surface 10b of the window 10, as shown in FIG. 5. The seal 24 further includes a flexible membrane 84 which is adapted to engage the side edge of the window 10 and which engages the interior and exterior surfaces 10a and 10b of the window 10 along its sides adjacent to the side edge thereof. This provides a seal for the front side edge of the window throughout its length. The seal means 24 further includes an integral deflectable flange or seal 86 which extends toward the window 10. The flexible seal 86 is adapted to be deflected by the window 10 and functions to both provide a seal between the front side edge of the window 10 and to bias the window 10 toward engagement with the outer flange 82.

It should be noted that the seal means 24 is made from a suitable rubber or elastomeric material having different durometers. The durometers of the seal are such that the flange 86 is readily deflected, the membrane 84 is readily deflected but that the outer flange 82 and remaining portions are substantially rigid. It should thus be apparent, as viewed in FIG. 5, that the flexible membrane seal 84 provides a seal around the front side edge of the window and that the deflectable seal 86 also provides a seal adjacent the front side edge of the window and as well as biasing the window 10 outwardly into engagement with the outer flange 82, in which position, the exterior surface 10b of the window will be substantially flush with the outer flange 82.

Figure 4:
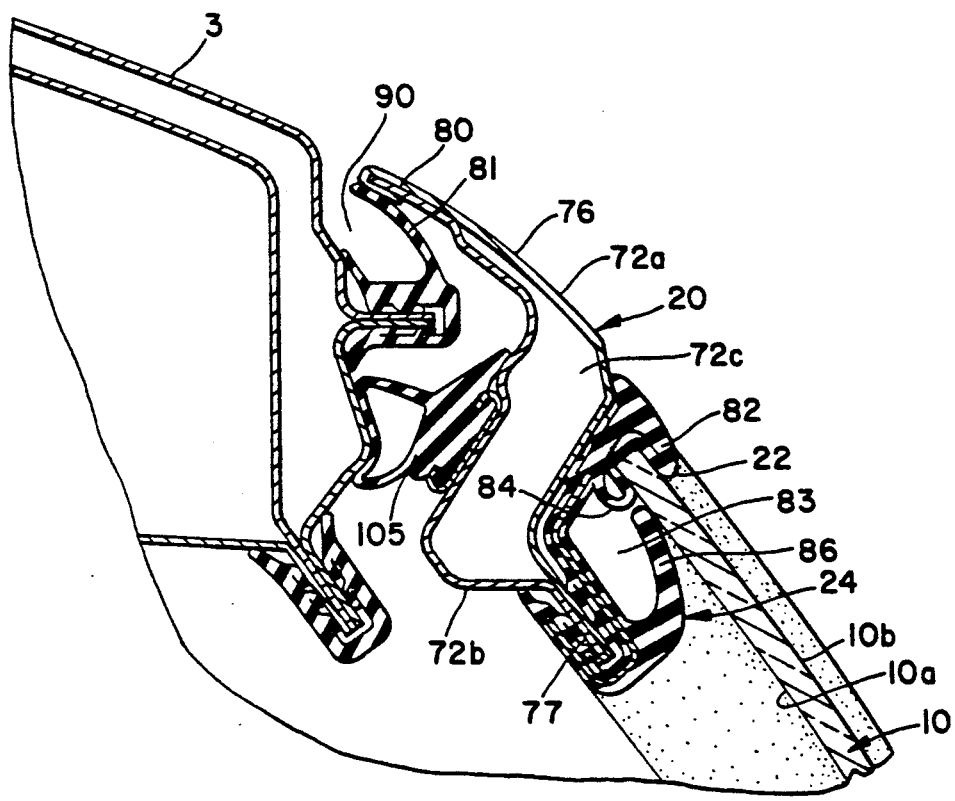
FIG. 4 is an enlarged fragmentary sectional view of part of the door assembly shown in FIG. 2.

As best shown in FIG. 4, the top 76 of the door frame means 20 is of an identical construction with the front side 72 of the door frame means 20 and corresponding parts thereof will be given the same reference numerals as the parts shown in FIG. 5 for the front side 72 of the door frame means 20. The top frame 76 differs from that of the front frame 72 only in that the deflectable seal 86 and the membrane seal 84 respectively engage the upper end and the top edge of the window 10 only when the latter is in its closed position. In addition, the upper edge portion 80 of the outer panel 72a engages the deflectable seal 81 when the door is in its closed position and defines with the roof structure a water drip channel 90. In all other respects the top 76 of the door frame means is identical to the front side 72 of the door frame means 20.

Figure 6:
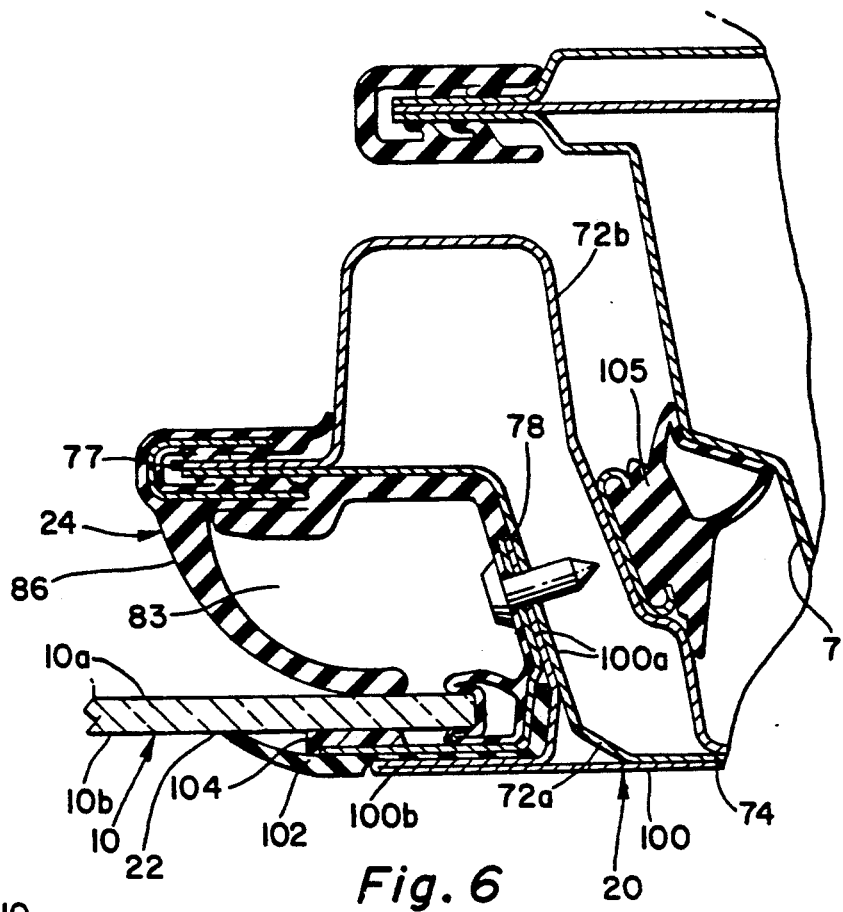
FIG. 6 is an enlarged fragmentary sectional view taken approximately along line 6—6 of FIG. 1.
Figure 7:
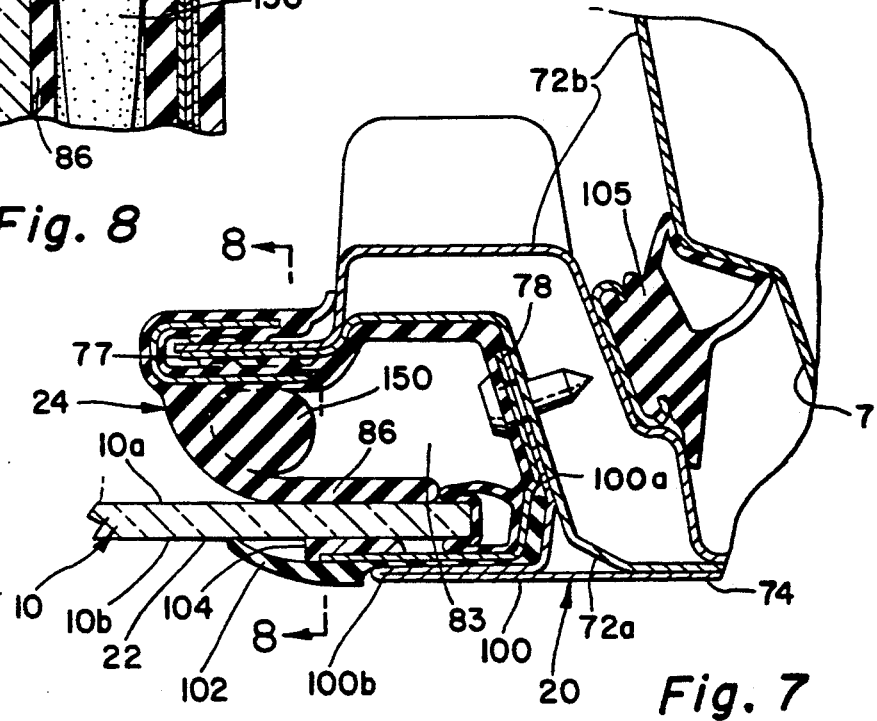
FIG. 7 is an enlarged fragmentary sectional view taken along lines 7—7 of FIG. 1; and, FIG. 8 is an enlarged fragmentary sectional view taken approximately along line 8—8 of FIG. 7.

Likewise, as best shown in FIGS. 6 and 7, the aft or rearward side 74 of the door frame means 20 is of a substantially similar construction to the previously described side 72 of the door frame means 20 except that it includes an additional stamped sheet metal member 100. To the extent that the aft side 74 of the door frame means 70 is identical to the previously described front side 72 of the door frame means 20, the same reference numerals will be employed to designate corresponding parts. The additional stamped member 100 is generally T-shaped, as viewed in cross section in FIG. 6, and has its stem 100a secured to the bottom 78 of the aft side 74. The member 100 is generally planar at its outer end to define an outer sheet metal flange 100b which is spaced laterally outwardly from the inner flange 77 and it also extends rearwardly to overlie a portion of the pillar 7 so as to provide a flush exterior surface.

Secured to the outer flange 100 along its interior side is a deflectable generally planar flange type seal 102 which is adapted to engage the exterior surface 10b of the window 10. Also, the outer flange carries a planar relatively thin plastic member 104 along its interior side adjacent the seal 102 which is adapted to be engaged by the exterior surface 10b of the window when biased outwardly by the deflectable seal 86. As shown in FIG. 6, when the window 10 is biased outwardly against the planar member 104 the exterior surface 10b of the window 10 will be substantially flush with the exterior surface of the sheet metal member 100 and seal 102. A suitable one piece seal 105 carried by the inner member or panel 72b of the front side 72, top 76 and rear side 74 of the frame means 20 is provided which engages the side pillars 6 and 7 and engages the roof along the top 76 to provide a continuous seal assembly when the door assembly 1 is in its closed position.

The window 10 is principally guided for movement between its open and closed positions by the guide channels 32, 34. The guide channels 32, 34 are of an identical construction and hence only the channel 34 will be described in detail. The channel 34 is a slightly curved U-shaped channel which is suitably supported by the end wall 68 and/or inner door panel 64 via brackets (not shown) and in a manner well known to those skilled in the art. The channels 32, 34 face toward each other and slidably receive the pin guides 36 suitably secured to the sides of the window 10 adjacent its lower end and in a manner also well known to those skilled in the art.

The window 10 is adapted to be moved between its closed position, as shown in the drawings, and an open position in which it is largely disposed within the interior compartment 70 of the lower door structure 12 by the window regulator mechanism 40. The window regulator mechanism 40 could be of any suitable or conventional construction and is here schematically shown in FIG. 1 as comprising a combined single arm 120 and sector gear 121 which is suitably pivotally connected to the inner door panel 64 of the lower door structure 12 in any suitable or conventional manner via a pivot pin means 122. The sector gear 121 is in meshed engagement with a pinion gear 124. The pinion gear 124 in turn being rotatably supported in any suitable manner by the inner door panel 64 of the door structure 12 and is also suitably drivingly connected to a handle, not shown, disposed interiorly of the vehicle 2. The single arm 120 at its end remote from the sector gear 121 carries a slide or roller (not shown) which is suitably slidably or rollably engaged in a sash channel 128 suitably secured to the lower end of the window 10. When the handle, not shown, is suitably rotated in one direction to cause the sector gear 121 and arm 120 to be rotated in a clockwise direction, as viewed in FIG. 1, the window 10 is caused to be lowered into the interior compartment 70 of the lower door structure 12. The window 10 is guided in this movement by the pin guides 36 which are slidably received in the channels 32, 34. Rotation of the sector gear 121 in the opposite direction, i.e., the counterclockwise direction, causes the window 10 to be raised from the interior compartment 70 of the lower door structure 12 upwardly until it reaches its closed position, as shown in the drawings.

Figure 3:
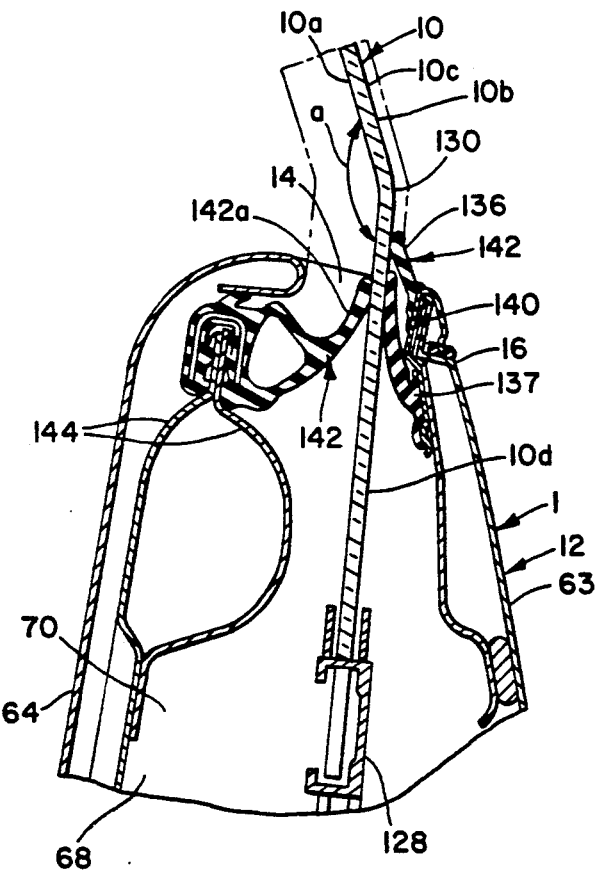
FIG. 3 is an enlarged fragmentary sectional view of part of the door assembly shown in FIG. 2.

Referring to FIGS. 2 and 3 of the drawings, it can be seen that the curved window 10 is also bent along a horizontal line 130 to define upper and lower portions 10c and 10d. The upper and lower portions 10c, 10d along their interior surface lie in planes that intersect each other and form an obtuse included angle a therebetween. Note that the bend 130 in the window 10 is located such that when the window 10 is in its closed position, the bend 130 is disposed slightly above the belt line 16 of the lower door structure 12. The bend 130 in the window 10 is such that when the window is in its upper or closed position, its exterior surface will lie substantially flush with the exterior surface of the outer door panel 63 of the lower door structure 12.

The window 10 at all times during its opening and closing movements and when in its closed position is engaged on its exterior side by the seal means 42, which extends laterally across the lower door structure 12 adjacent its top opening 14. The seal means 42 comprises a first upwardly disposed flipper seal 136 which engages the exterior side 10b of the window and which is suitably secured to a member 140 carried by the outer door panel 63 of the lower body structure 12. The seal means 42 also includes a lower flipper seal 137 also secured to the member 140 and which engages the exterior surface 10b of the window 10. The seals 136, 137 prevent moisture or debris from entering into the compartment 70. In addition to the seal means 42, an interior seal 142 is provided. This seal is carried by inner panels 144 secured to the inner wall 64 of the lower body structure 12 and also includes a deflectable or flipper seal portion 142a for engaging the interior surface 10a of the window.

As can be seen from FIG. 1 of the drawings, the side pin guides 36 are slidably received within the guide channels 32, 34 and are at all times disposed below the belt line 16 and located in the interior compartment 70 of the lower body structure 12. As also can be seen from FIG. 2, the window 10 along its upper portion is curved so that when it is in its upper closed position, as viewed in FIG. 2, the window tends, due to its weight, to move laterally inwardly or tumble inwardly As thus far described, the principal thing preventing the upper portion 10c of the window 10 from moving inwardly toward the flange 77 is the deflectable seal 86 biasing the window 10 outwardly towards the outer flanges 82 of the front side 72 and top 76 and the outer flange 100b of the rear side 74 of the frame means 20.

In the known prior art for flush glass arrangements, to ensure stability of the window 10 and prevent inward tumbling of the window 10 as it approaches its closed position, the window has been provided with an additional pin guide means adjacent its top rearward edge and/or top front edge which is received within a guide channel. This, however, requires the addition of another guide channel or guide means located in the door frame and also necessitates an additional operation for attaching another guide pin to the window. It is also possible to provide stability against inward movement of the window 10, when in its closed position, by using a sufficiently strong seal means for engaging the inner side of the window and biasing the window outwardly. This, however, results in a high frictional engagement between the window and the seal and thus, makes movement of the window between its open and closed positions more difficult.

Figure 8:
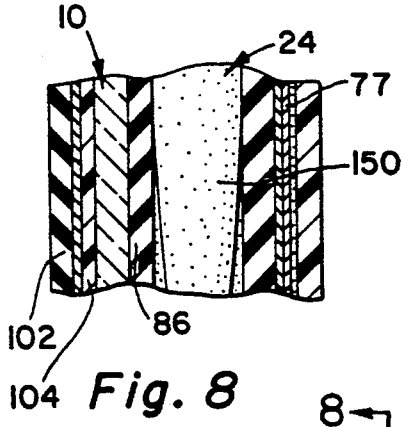

To avoid the use of high friction seals and/or the use of a side pin guide adjacent the upper end of the window in order to achieve stability, the present invention provides a dowel means 150, preferably a tapered vertically disposed dowel means, integral with the seal means 24 along a portion adjacent the top edge of the seal means along the rear side 74 of the door frame 20. The dowel means or dowel 150 is located between the inner flange 77 and the seal 86 of the seal means 24. By providing the tapered dowel means 150 along a portion adjacent the top end of the rear side 74 of the door frame 20, the deflection of the seal 86 inwardly is limited. Alternately, the dowel 150 could be a separate element which is adhesively secured to the seal means 24. As shown in FIG. 8, the dowel 150 is progressively tapered so that its diameter at its lower end is less than the diameter at its upper end.

As best shown in FIGS. 2 and 8, the window 10, as it is being moved upwardly towards its closed position, is biased outwardly by the seal 86 engaging the interior surface 10a thereof. As the curved window 10 approaches its closed position and when it would tend to move inwardly toward the inner flange 77 due to its weight, the upper side portion of the window 10 at the rear side 74 will be received between the dowel 150 and the member 104 carried by the outer flange 100b. The dowel 150 prevents or limits the seal 86 from being deflected inwardly. The dowel thus positions the window outwardly against the member 104 on the outer flange 100b and retains it in place even though the weight of the window is tending to move the same inwardly of the vehicle. When the window is fully closed it would be wedged between the dowel and seal 86 and the member 104 carried by the outer flange 100b so that it is positively retained at its upper rearward edge as well as being positively retained at its left and right lower edges within the guide channels 32, 34. This provides a three point or triangulated stabilization means to prevent movement of the window 10 inwardly. By providing the dowel 150 to stabilize the window adjacent its top when in its closed position, a more readily deflectable seal 86 can be used. This in turn reduces the frictional force between the seal 86 and window 10 during most of the movement of the latter and thus, requires less force to effect movement of the window 10.

From the foregoing, it should be apparent that, when the window is in its closed position, its top edge will be substantially flush with the outer flange 82 of the top 76, the sides of the window 10 will be substantially flush with the outer flanges 82 and 100*b* of the front and rear sides 72, 74 and at the window 10, due to its bend 130 will have its outer surface substantially flush with the outer surface of the outer door panel 63 of the lower body structure 12. This creates a flush glass system in which the window glass 10 is substantially flush on all four sides thereof when in its closed position. It should also be apparent that this substantial flushness is achieved without requiring the use of any complicated guide track arrangement, without requiring the use of any additional pin guides adjacent the upper edge of the window which in turn must be slidably received in some suitable guide channel or means, and without requiring the use of seals having a strong outward biasing force. It thus provides a simplified flush glass arrangement which is highly stabilized when in its closed position.

Although the illustrated embodiment thereof has been described in great detail, it should be apparent that certain modifications, changes and adaptations may be made in the illustrated embodiment, and that it is intended to cover all such modifications, changes and adaptations which come within the spirit of the present invention.

The embodiments of the invention in which an exclusive property or privilege is claimed are defined as follows:

1. A framed vehicle door assembly comprising a lower body structure having spaced inner and outer panels and a pair of spaced end walls which together define a compartment having a top opening extending longitudinally of the door assembly, an upper door frame means having fore and aft side and a top which together with the lower body structure defines a window opening, said upper frame means including spaced inner and outer flanges, a window supported for movement through the top opening between open and closed positions, said window along its sides being received between said inner and outer flanges of said fore and aft portions of said upper door frame means, said window having a horizontal bend between its upper and lower ends to define upper and lower window portions whose adjacent interior surfaces define an obtuse included angle therebetween, said bend in said window being located adjacent said top opening of said lower body structure when the window is in its closed position, said frame means including a first deflectable seal means engageable with said window along its sides on its interior surface for biasing said window outwardly toward engagement with said exterior flange of said frame means, spaced guide channel means supported by said lower body structure and located within said compartment, a pair of guides secured to said lower portion of said window at its opposite sides, said guides being slidably received within said guide channel means, window regulator means carried by said lower body structure for supporting and effecting movement of said window between its open and closed positions, second deflectable seal means carried by said lower body structure adjacent said top opening thereof for engagement with said window when in its closed position, said bend in said window and said guide channel means causing said window to be positioned so that the upper portion thereof will be substantially flush with said outer flange of said frame means and be substantially flush with the outer panel of said lower door structure when the window reaches its closed position, and means for stabilizing the window against lateral inward movement when in its closed position, the improvement being that said last named means comprises a dowel carried by one of said fore and aft portions of said door frame means along its upper end and located between said inner flange and said first seal means for limiting inward deflection of said first seal means and for maintaining the adjacent upper side end of said window in engagement with said outer flange of said door frame means whereby said window is stabilized at said upper side end without the need for any additional side guide secured to upper side end of said window.

2. A framed vehicle door assembly, as defined in claim 1, and wherein said dowel is integral with said seal means.

3. A framed vehicle door assembly, as defined in claim 1, and wherein said dowel is vertically disposed and progressively tapered so that its diameter at its lower end is less than the diameter at its upper end.

4. A framed vehicle door assembly, as defined in claim 3, and wherein said dowel is integral with said seal means.

* * * * *